US011163700B1

(12) United States Patent
Williams et al.

(10) Patent No.: US 11,163,700 B1
(45) Date of Patent: Nov. 2, 2021

(54) INITIATING INTERCONNECT OPERATION WITHOUT WAITING ON LOWER LEVEL CACHE DIRECTORY LOOKUP

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US); Luke Murray, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/862,785

(22) Filed: Apr. 30, 2020

(51) Int. Cl.
*G06F 12/128* (2016.01)

(52) U.S. Cl.
CPC ................... *G06F 12/128* (2013.01)

(58) Field of Classification Search
CPC .................................................. G06F 12/128
USPC ......................................................... 711/122
See application file for complete search history.

(56) References Cited

U.S. PATENT DOCUMENTS

| 7,536,513 | B2 | 5/2009 | Guthrie et al. | |
|---|---|---|---|---|
| 9,378,142 | B2 | 6/2016 | Ramanujan et al. | |
| 2012/0221793 | A1* | 8/2012 | Tran | G06F 9/3851 711/122 |
| 2016/0011787 | A1* | 1/2016 | Ogawa | G06F 3/0689 711/114 |

OTHER PUBLICATIONS

Ahn et al., "DASCA: Dead Write Prediction Assisted STT-RAM Cache Architecture",Department of Electrical and Computer Engineering, IEEE 2014.
Mittal et al., "A Survey of Cache Bypassing Techniques", Journal of Low Power Electronics and Applications, Apr. 28, 2016—www.mdpi.com/journal/jlpea.

* cited by examiner

*Primary Examiner* — Jae U Yu
(74) *Attorney, Agent, or Firm* — Brian F. Russell; Nathan Rau

(57) ABSTRACT

An upper level cache receives from an associated processor core a plurality of memory access requests including at least first and second memory access requests of differing first and second classes. Based on class histories associated with the first and second classes of memory access requests, the upper level cache initiates, on the system interconnect fabric, a first interconnect transaction corresponding to the first memory access request without first issuing the first memory access request to the lower level cache via a private communication channel between the upper level cache and the lower level cache. The upper level cache initiates, on the system interconnect fabric, a second interconnect transaction corresponding to the second memory access request only after first issuing the second memory access request to the lower level cache via the private communication channel between the upper level cache and the lower level cache and receiving a response to the second memory access request from the lower level cache.

20 Claims, 10 Drawing Sheets

INITIATING INTERCONNECT OPERATION WITHOUT WAITING ON LOWER LEVEL CACHE DIRECTORY LOOKUP

BACKGROUND OF THE INVENTION

The present invention relates generally to data processing and, in particular, to storage accesses to the distributed shared memory system of a data processing system.

A conventional multiprocessor (MP) computer system, such as a server computer system, includes multiple processing units, each including one or more processor cores. The processing units are all coupled to an interconnect fabric, which typically comprises one or more address, data and control buses. Coupled to the interconnect fabric are one or more system memories, which together represent the lowest level of processor-addressable memory in the multiprocessor computer system and which are generally accessible for read and write access by all processing units. In order to reduce access latency to instructions and data residing in the system memory, each processing unit is typically further supported by a respective multi-level vertical cache hierarchy.

Cache memories are commonly utilized to temporarily buffer memory blocks that might be accessed by a processor core in order to speed up processing by reducing access latency introduced by having to load needed data and instructions from system memory. In some MP systems, the vertical cache hierarchy associated with each processor core includes at least two levels, referred to as level one (L1) and level two (L2) caches. The L1 (or upper-level) cache is usually a private cache associated with a particular processor core and cannot be accessed by other cores in an MP system. In some cases, the vertical cache hierarchy associated with a given processor core may include additional lower levels, such as a level three (L3) cache, which in some cases can be configured as a "victim" cache populated at least in part by memory blocks evicted from higher level caches within the same vertical cache hierarchy.

Typically, in response to a memory access instruction, such as a load-type or store-type instruction, the processor core first accesses the cache directory of the L1 cache to determine if the associated request address hits in the L1 cache directory. If not, a memory access request is sent successively to each lower-level cache (e.g., the level two (L2) cache, and then if present, the level three (L3) cache) to determine if the request address hits in the cache directory of that lower-level cache. If the directory lookup indicates that the requested memory block is present in one of these lower-level caches (i.e., the directory lookup results in a cache "hit"), the memory access request can often be serviced without incurring the large latency associated with issuing an interconnect operation targeting the requested memory block on the interconnect fabric. However, if the directory lookups indicate that the requested memory block is not present in any of the lower-level caches of the vertical cache hierarchy (i.e., the directory lookups result in cache "misses"), the vertical cache hierarchy of the requesting processor must initiate an interconnect operation on the system interconnect fabric in order to obtain the requested memory block (e.g., from system memory or another vertical cache hierarchy) and any associated coherence permission required to service the memory access request.

BRIEF SUMMARY

The present application appreciates that, in the prior art, the total latency of a memory access request that misses in all of the cache directories of a vertical cache hierarchy includes the latencies associated with the directory lookups performed at each level of the cache hierarchy plus the latency associated with the interconnect operation itself. The present application further appreciates that, for memory access requests likely to result in issuance of an interconnect operation on the system interconnect fabric, it would be desirable to reduce latency by issuing the interconnect operation without awaiting the result of a lookup of a request address in the directory of a lower-level cache.

In at least one embodiment, an upper level cache receives from an associated processor core a plurality of memory access requests including at least first and second memory access requests of differing first and second classes. Based on class histories associated with the first and second classes of memory access requests, the upper level cache initiates, on the system interconnect fabric, a first interconnect transaction corresponding to the first memory access request without first issuing the first memory access request to the lower level cache via a private communication channel between the upper level cache and the lower level cache. The upper level cache initiates, on the system interconnect fabric, a second interconnect transaction corresponding to the second memory access request only after first issuing the second memory access request to the lower level cache via the private communication channel between the upper level cache and the lower level cache and receiving a response to the second memory access request from the lower level cache.

DETAILED DESCRIPTION

Figure 1:
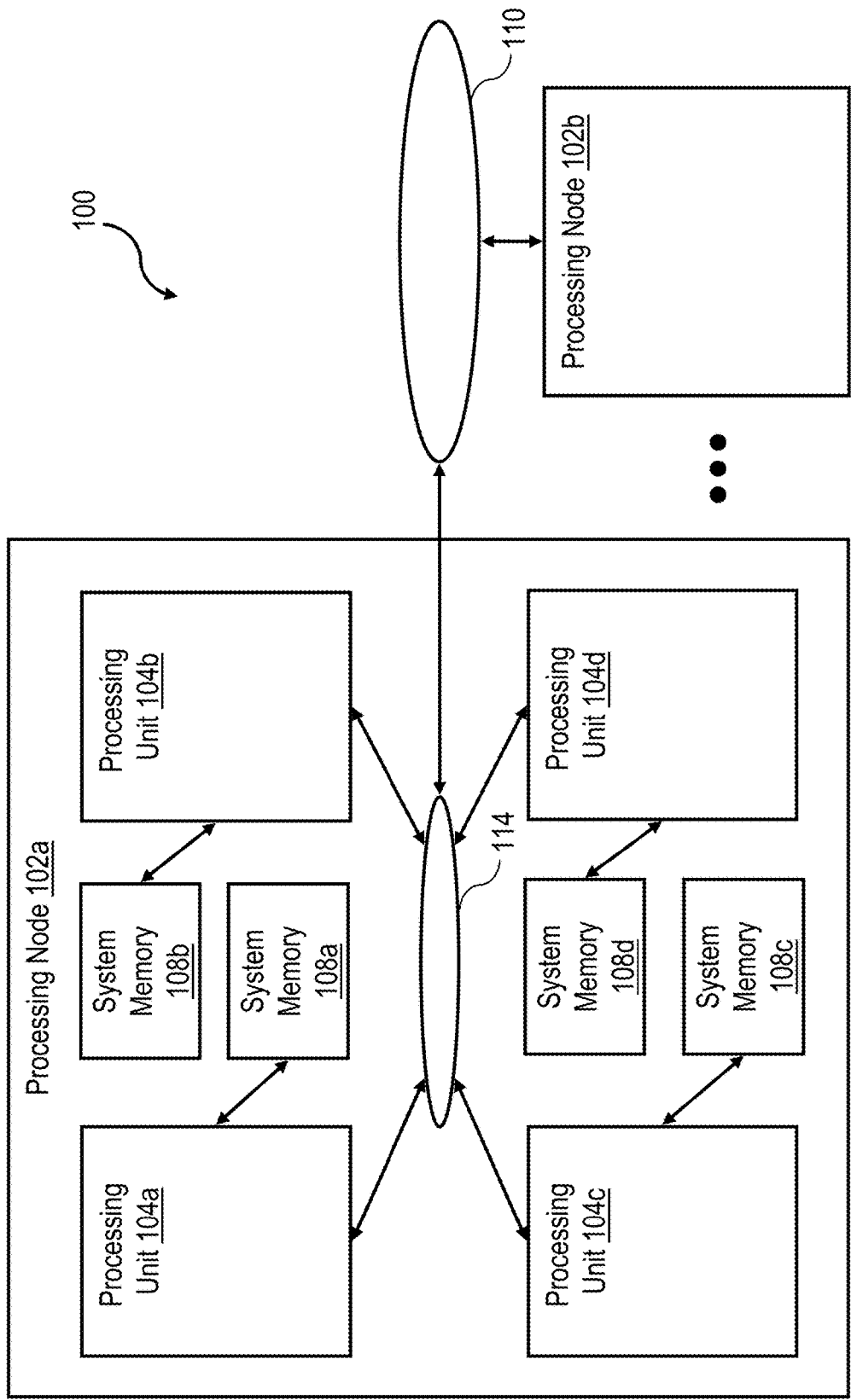
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high-level block diagram depicting an exemplary data processing system 100 in accordance with one embodiment. In the depicted embodiment, data processing system 100 is a cache-coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit, which includes a semiconductor substrate in which integrated circuitry is formed as is known in the art. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system interconnect fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached, and modified by a processor core in any processing unit 104 of any processing node 102 within data processing system 100. System memories 108 thus form the lowest level of processor-addressable storage in the distributed shared memory system of data processing system 100. In alternative embodiments, one or more memory controllers 106 (and system memories 108) can be coupled to system interconnect 110 rather than to a local interconnect 114.

Those skilled in the art will appreciate that SMP data processing system 100 of FIG. 1 can include many additional non-illustrated components, such as interconnect bridges, additional storage devices, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache-coherent data processing systems of diverse architectures and are in no way limited to the generalized data processing system architecture illustrated in FIG. 1.

Figure 2:
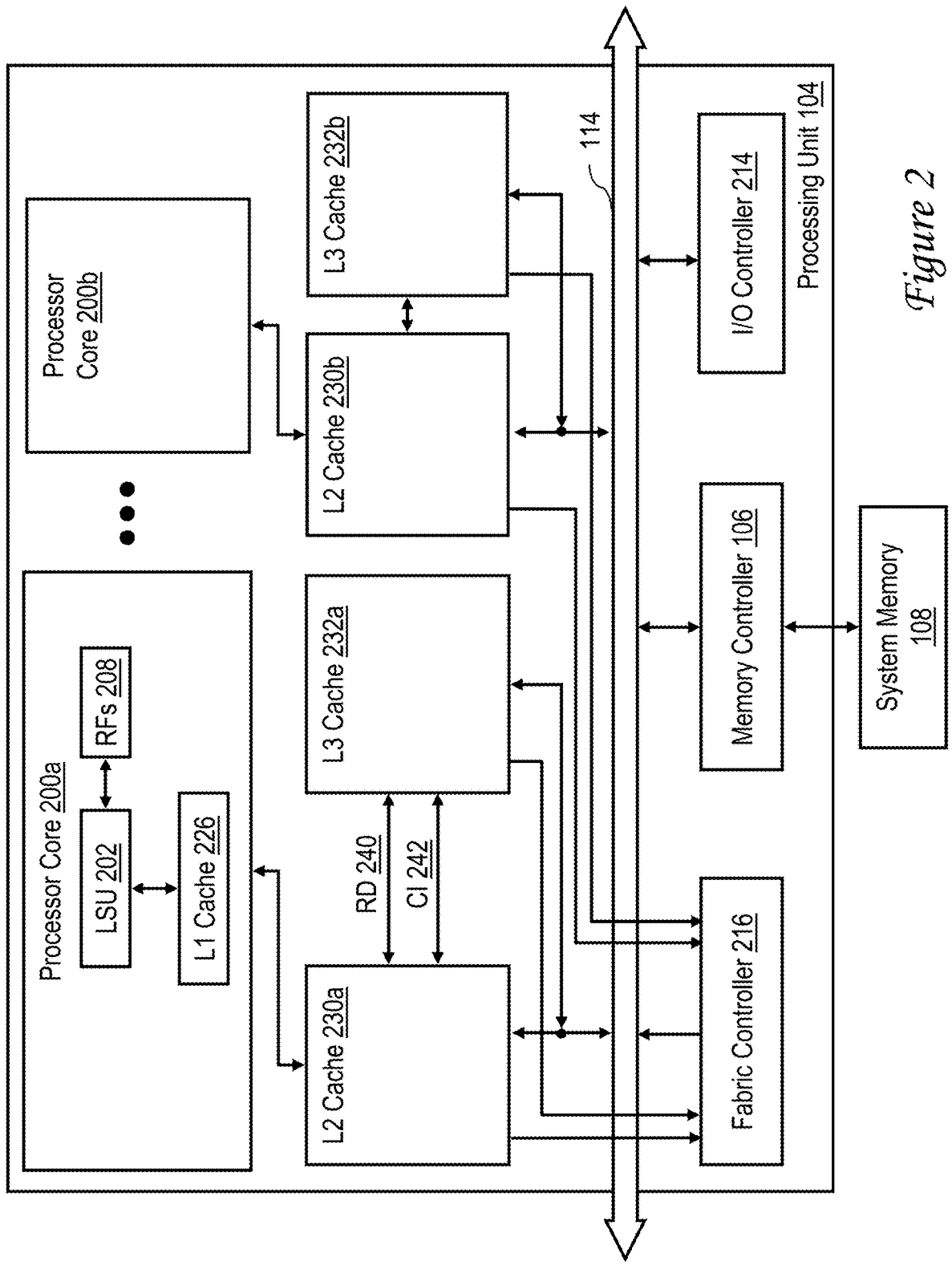
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In some embodiments, each processor core 200 is capable of independently executing multiple simultaneous hardware threads of execution. However, in order to avoid obscuring the invention in the following description processing units 104 are generally described with respect to an embodiment in which each processor core 200 can execute only a single thread at a time. Modifications and/or additions to the described embodiment required to apply the principles and techniques to processing units having processor cores supporting SMT execution that are not explicitly described herein will be apparent to those skilled in the art.

As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and updates to memory blocks specified by store accesses are written to the distributed shared memory system from the one or more register files 208.

The operation of each processor core 200 is supported by a multi-level memory hierarchy having at its lowest level shared system memories 108 accessed via memory controllers 106, and at its upper levels, a vertical cache hierarchy, which in the illustrative embodiment includes a store-through level-one (L1) cache 226 within and private to each processor core 200, a respective store-in level-two (L2) cache 230a, 230b for each processor core 200a, 200b, and a respective lookaside level-three (L3) victim cache 232a, 232b for each processor core 200a, 200b populated, at least in part, with cache lines evicted from one or more of L2 caches 230a, 230b. As shown in detail for L2 cache 230a and L3 cache 232a, each L2-to-L3 private interface includes a number of channels, including read (RD) channel 240 and cast-in (CI) channel 242. Each of L2 caches 230 and L3 caches 232 is further coupled to local interconnect 114 and to a fabric controller 216 to facilitate participation of caches 230, 232 in the coherent data communication on the system interconnect fabric of data processing system 100.

Although the illustrated cache hierarchies includes only three levels of cache, those skilled in the art will appreciate that alternative embodiments may include additional levels (L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system interconnect fabric comprising local and system interconnects 110, 114 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access (e.g., load-type or store-type) instruction requesting a specified memory access operation to be performed, LSU 202 executes the memory access instruction to determine the target address (e.g., an effective address) of the memory access request. After translation of the target address to a real request address, the directory of L1 cache 226 is accessed utilizing the real request address. Assuming the directory lookup indicates the memory access cannot be satisfied solely by reference to L1 cache 226, LSU 202 then transmits the memory access request, which includes at least a transaction type (ttype) (e.g., load or store) and the target real address, to its affiliated L2 cache 230 for servicing. In servicing the memory access request, L2 cache 230 may access its associated L3 cache 232 and/or initiate an interconnect operation corresponding to the memory access request on the system interconnect fabric.

Figure 3:
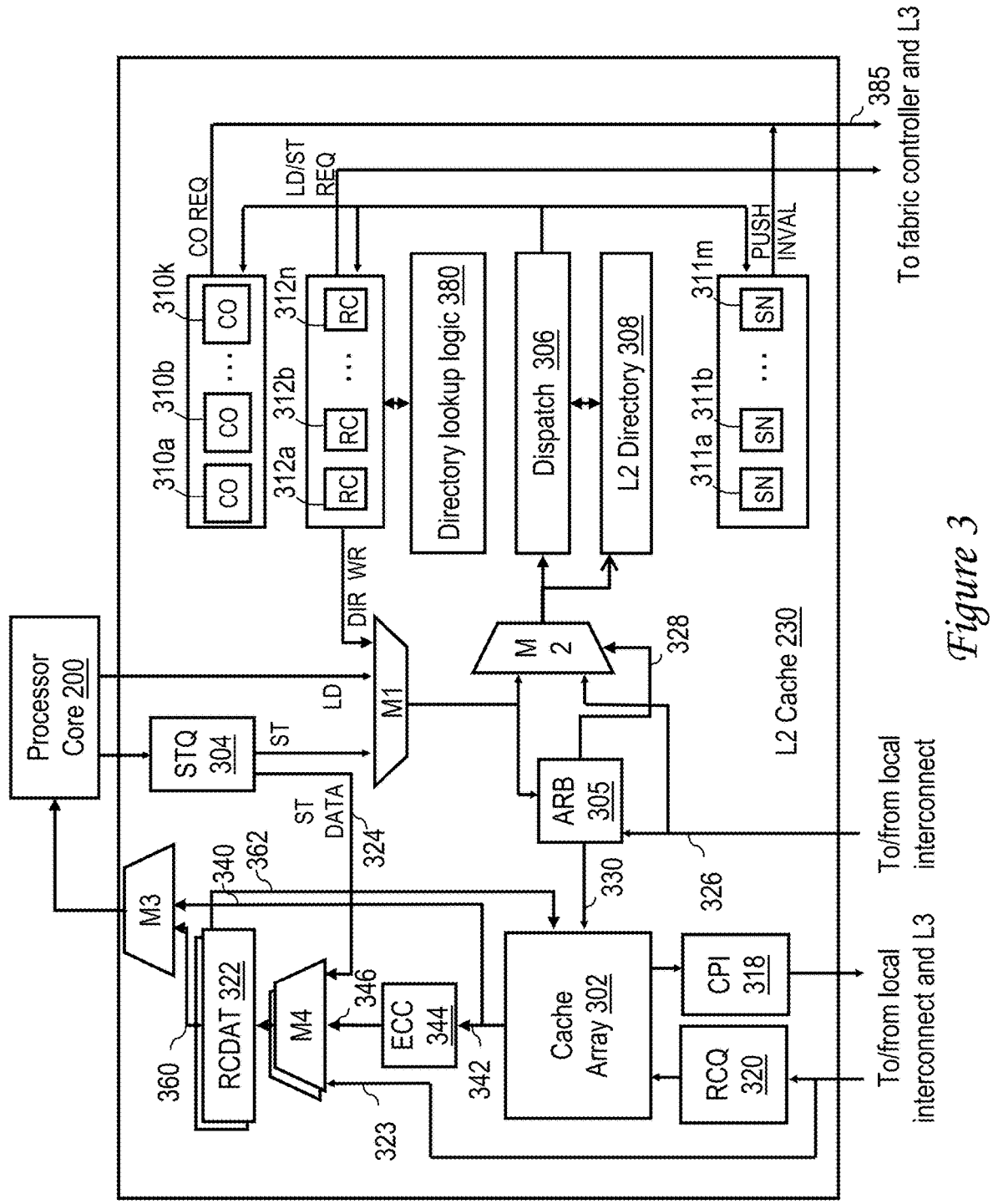
FIG. 3 is a more detailed block diagram of a level-two (L2) cache in accordance with one embodiment.

With reference now to FIG. 3, there is illustrated a more detailed block diagram of an exemplary embodiment of an L2 cache 230 in accordance with one embodiment. As shown in FIG. 3, L2 cache 230 includes a cache array 302 and a L2 directory 308 of the contents of cache array 302. Although not explicitly illustrated, cache array 302 can be implemented with a single read port and single write port to reduce the die area required to implement cache array 302.

Assuming cache array 302 and L2 directory 308 are set-associative as is conventional, memory locations in system memories 108 are mapped to particular congruence classes within cache array 302 utilizing predetermined index bits within the system memory (real) addresses. The particular memory blocks stored within the cache lines of cache array 302 are recorded in L2 directory 308, which contains one directory entry for each cache line. While not expressly depicted in FIG. 3, it will be understood by those skilled in the art that each directory entry in L2 directory 308 includes various fields, for example, a tag field that identifies the real address of the memory block held in the corresponding cache line of cache array 302, a state field that indicate the coherence state of the cache line, an LRU (Least Recently Used) field indicating a replacement order for the cache line with respect to other cache lines in the same congruence class, and inclusivity bits indicating whether the memory block is held in the associated L1 cache 226.

L2 cache 230 includes multiple (e.g., 16) Read-Claim (RC) machines 312a-312n for independently and concurrently servicing load-type (LD) and store-type (ST) requests received from the affiliated processor core 200. RC machines 312 are coupled to directory lookup logic 380, as discussed further below with reference to FIG. 4. In order to service remote memory access requests originating from processor cores 200 other than the affiliated processor core 200, L2 cache 230 also includes multiple snoop machines 311a-311m. Each snoop machine 311 can independently and concurrently handle a remote memory access request "snooped" from the system interconnect fabric (and, in particular, local interconnect 114). As will be appreciated, the servicing of memory access requests by RC machines 312 may require the replacement or invalidation of memory blocks within cache array 302. Accordingly, L2 cache 230 also includes CO (castout) machines 310a-310k that manage the removal of memory blocks from cache array 302 and the storage of those memory blocks in system memory 108 (i.e., memory writebacks) or the affiliated L3 cache 232 (i.e., L3 cast-ins).

L2 cache 230 further includes an arbiter 305 that controls multiplexers M1-M2 to order the processing of local memory access requests of the associated processor core and remote memory access requests snooped on local interconnect 114. These incoming requests are forwarded in accordance with the arbitration policy implemented by arbiter 305 to dispatch logic, such as a dispatch pipeline 306, which processes each memory access request with respect to L2 directory 308 and cache array 302 and, if necessary and the required resource is available, dispatches the memory access request to the appropriate state machine for handling.

L2 cache 230 also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that CO machines 310 and snoopers 311 direct transfer of data from cache array 302 (e.g., to another L2 cache 230, to the associated L3 cache 232, or to a system memory 108) via only their respective designated CPI buffer entries.

Each RC machine 312 also has assigned to it a respective one of multiple RC data (RCDAT) buffers 322 for buffering a memory block read from cache array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, a processor core 200 transmits store-type requests comprising a transaction type (ttype), target real address, and store data to a store queue (STQ) 304. After possible gathering of the store data in STQ 304 with the store data of one or more other store requests to form up to a full cache line (e.g., 128 B) of data, the store data are transmitted to store data multiplexer M4 via data path 324, and the transaction type and target address are passed to multiplexer M1. Multiplexer M1 also receives as inputs processor load-type requests from processor core 200 and directory write requests from RC machines 312. In response to unillustrated select signals generated by arbiter 305, multiplexer M1 selects one of its input requests to forward to multiplexer M2, which additionally receives as an input a remote memory access request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local memory access request received from multiplexer M1 or the remote memory access request snooped from local interconnect 114 as the next memory access request to be processed.

The memory access request selected for processing by arbiter 305 is placed by multiplexer M2 into dispatch pipeline 306. In some embodiments, dispatch pipeline 306 can be implemented as a fixed duration pipeline in which each of multiple possible overlapping requests is processed for a predetermined number of clock cycles (e.g., 4 cycles). During the first cycle of processing within dispatch pipeline 306, a directory read (lookup) is performed utilizing the real request address to determine if the request address hits or misses in L2 directory 308, and if the memory address hits, the coherence state of the target memory block. The directory information, which includes a hit/miss indication and the coherence state of the memory block, is returned by L2 directory 308 to dispatch pipeline 306 in a subsequent cycle. As will be appreciated, no action is generally taken within an L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 104, may entail communication on the system interconnect fabric via fabric controller 216.

At a predetermined time during processing of the memory access request within dispatch pipeline 306, arbiter 305 transmits the request address to cache array 302 via address and control path 330 to initiate a cache read of the memory block specified by the request address. The memory block read from cache array 302 is transmitted via data path 342 to Error Correcting Code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 makes a dispatch determination based upon a number of criteria, including (1) the presence of an address collision between the request address and a previous request address currently being processed by a castout machine 310, snoop machine 311, or RC machine 312, (2) the directory information, and (3) availability of an RC machine 312 or snoop machine 311 to process the memory access request. If dispatch pipeline 306 makes a dispatch determination that the memory access request is to be dispatched, the memory access request is dispatched from dispatch pipeline 306 to an RC machine 312 or a snoop machine 311. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of L2 directory 308, if necessary. In addition, the RC machine 312 may perform a cache write to update the relevant cache line of cache array 302. Directory writes and cache writes may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state.

Associated with RC machines 312 is data handling circuitry, different portions of which are employed during the servicing of various types of local memory access requests. For example, for a local load request that hits in L2 directory 308, an uncorrected copy of the target memory block is forwarded from cache array 302 to the affiliated processor core 200 via data path 340 and load data multiplexer M3 and additionally forwarded to ECC logic 344 via data path 342. In the case of an ECC error in the target memory block obtained by the local load request, corrected data is forwarded to RCDAT buffer 322 via data path 346 and store data multiplexer M4 and then from RCDAT 322 to affiliated processor core 200 via data path 360 and load data multiplexer M3. For a local store request, store data is received within RCDAT buffer 322 from STQ 304 via data path 324 and store data multiplexer M4, the store is merged with the memory block read into RCDAT buffer 322 from cache array 302 via ECC logic 344 and store data multiplexer M4, and the merged store data is then written from RCDAT buffer 322 into cache array 302 via data path 362. In response to a local load miss or local store miss, the target memory block acquired through issuing a memory access operation on local interconnect 114 is loaded into cache array 302 via reload bus 323, store data multiplexer M4, RCDAT buffer 322 (with store merge for a store miss) and data path 362.

Figure 4:
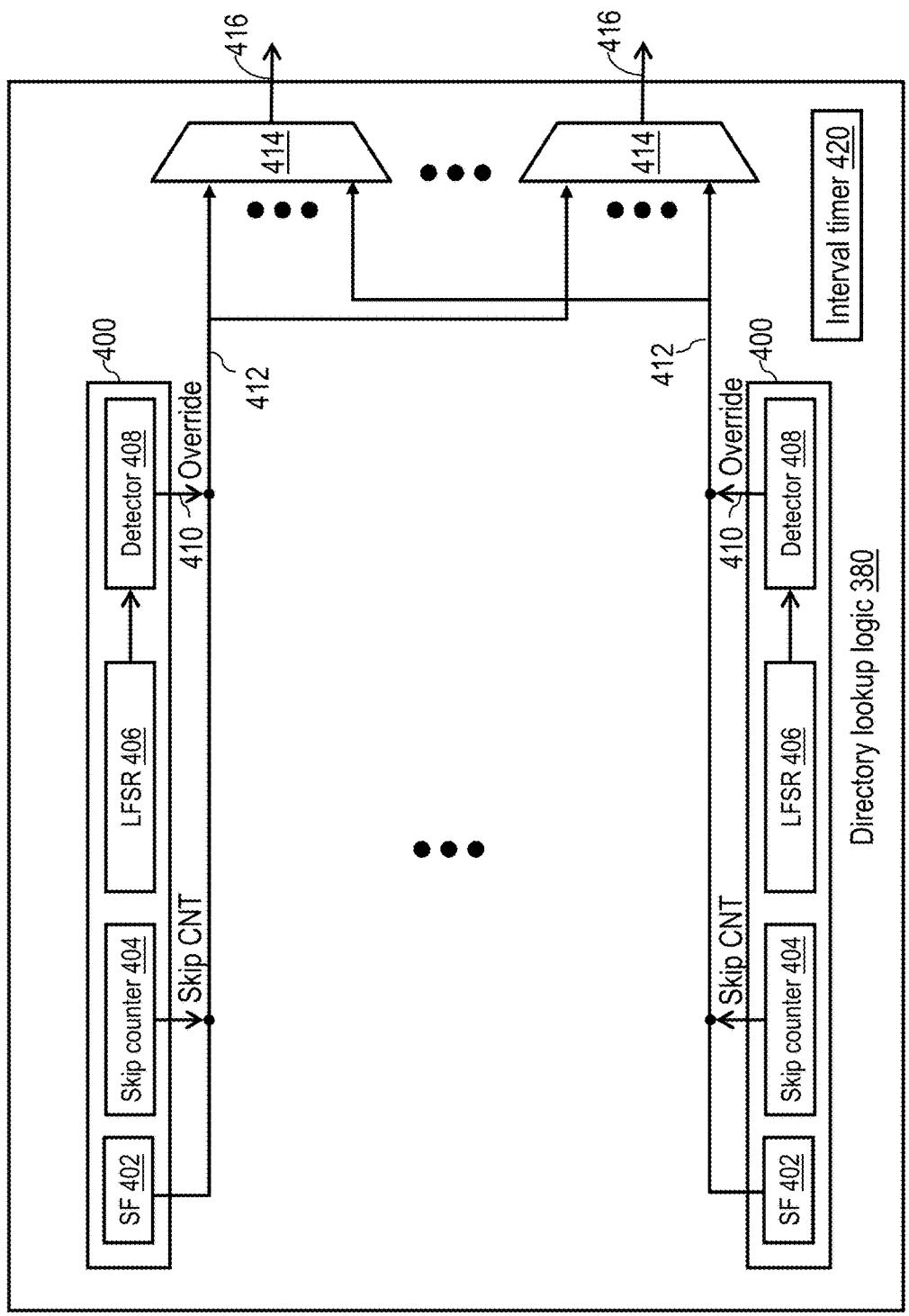
FIG. 4 is a more detailed block diagram of directory lookup logic in accordance with one embodiment.

Referring now to FIG. 4, there is illustrated a more detailed view of directory lookup logic 380 of L2 cache 230 in accordance with one embodiment. As discussed further below, directory lookup logic 380 is a circuit that determines whether or not to issue, if necessary, an interconnect operation on the system interconnect without awaiting results of a directory lookup in a lower-level cache (e.g., the associated L3 cache 232).

As depicted, directory lookup logic 380 includes one or more instances of tracking logic 400. In at least one embodiment, each instance of tracking logic 400 is associated with a different class of memory access request (e.g., load, load-and-reserve, partial cache line store, full cache line store, store-conditional, write, etc.) and maintains an aggregate class history for the associated class of memory access requests. Each instance of tracking logic 400 includes a skip flag 402 that, when set, indicates to initiate an interconnect operation for the associated class of memory access request on the system interconnect without awaiting results of a directory lookup in the lower-level cache and that, when reset, indicates to initiate an interconnect operation for the associated class of memory access request on the system interconnect after receipt of results of a directory lookup in the lower-level cache. Each instance of tracking logic 400 additionally includes a skip counter 404 that maintains a skip count (CNT) for the given class of memory access request. As discussed further below, the skip CNT can be incremented if a memory access request is unable to be serviced with respect to the lower-level cache following a lookup of the request address in the directory of the lower-level cache. If the skip CNT satisfies (e.g., exceeds, or alternatively, is greater than or equal to) a skip CNT threshold (which can be programmable and can differ per class of memory access request), directory lookup logic 380 sets the associated skip flag 402. In the given example, each instance of tracking logic 400 can optionally further includes a linear-feedback shift register (LFSR) 406 and an associated detector 408. LFSR 406 is configured to generate a pseudo-random value. When that pseudo-random value matches a predetermined override pattern, as detected by detector 408, detector 408 generates an override signal 410 that overrides the indication provided by the associated skip flag 402. The value of the skip flag 402, the skip CNT in skip counter 404, and override signal 410 together form a class signal set 412.

In the depicted embodiment, directory lookup logic 380 additionally includes multiple multiplexers 414, each associated with a respective one of RC machines 312. Each multiplexer 414 includes a plurality of inputs for receiving class signal sets 412 from all of instances of tracking logic 400. Each multiplexer 414 selects from among its inputs and outputs to the associated RC machine 312 the particular class signal set 412 for the class of memory access request then being handled by the associated RC machine 312, as generally illustrated at reference numeral 416.

In the embodiment of FIG. 4, directory lookup logic 380 also includes an interval timer 420 that is utilized to define a skip CNT maintenance interval over which the skip CNT values within skip counters 404 may be reduced to require that last level cache misses that cause the skip flags 402 to be set have occurred within a given temporal window. The operation of interval timer 420 is discussed in greater detail below with reference to FIG. 9.

Figure 5:
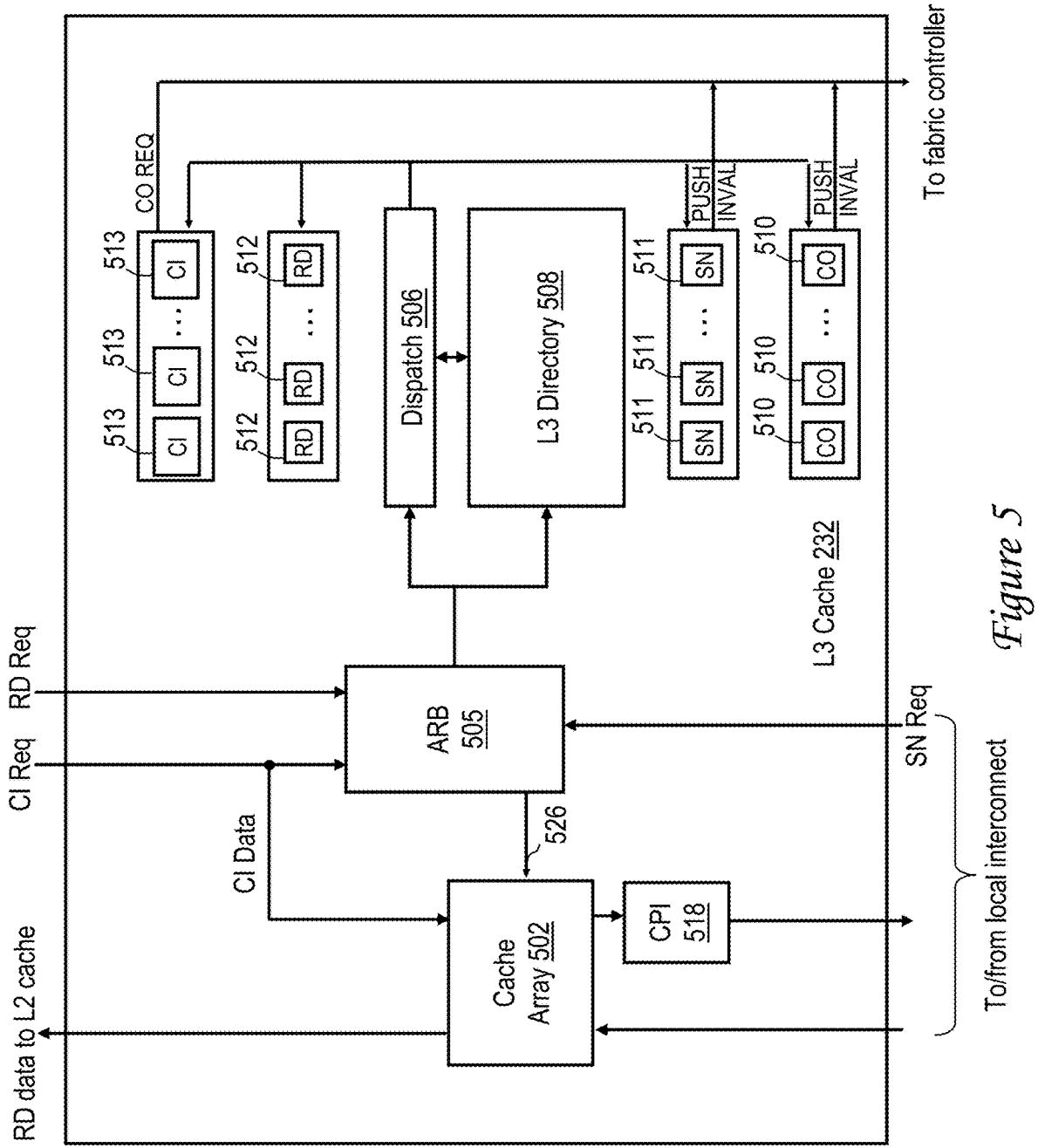
FIG. 5 is a detailed block diagram of level-three (L3) cache in accordance with one embodiment.

With reference now to FIG. 5, there is illustrated a more detailed block diagram of an exemplary embodiment of an L3 cache 232 in accordance with one embodiment. As shown in FIG. 5, L3 cache 232 includes a cache array 502 and an L3 directory 508 of the contents of cache array 502. Assuming cache array 502 and L3 directory 508 are set-associative as is conventional, memory locations in system memories 108 are mapped to particular congruence classes within cache array 502 utilizing predetermined index bits within the system memory (real) addresses. The particular memory blocks stored within the cache lines of cache array 502 are recorded in L3 directory 508, which contains one directory entry for each cache line. While not expressly depicted in FIG. 5, it will be understood by those skilled in the art that each directory entry in L3 directory 508 includes various fields, for example, a tag field that identifies the real address of the memory block held in the corresponding cache line of cache array 502, a state field that indicate the coherence state of the cache line, and an LRU (Least Recently Used) field indicating a replacement order for the cache line with respect to other cache lines in the same congruence class.

Like L2 cache 230 of FIG. 3, L3 cache 232 additionally includes various state machines to service various types of requests and to transfer data into and out of cache array 502. For example, L3 cache 232 includes multiple (e.g., 16) Read (RD) machines 512 for independently and concurrently servicing read (RD) requests received from the affiliated L2 cache 230 via RD channel 240. L3 cache 232 also includes multiple snoop (SN) machines 511 for handling memory access requests snooped from the system interconnect fabric (e.g., local interconnect 114). As is known in the art, the servicing of snooped requests may include, for example, invalidating cache lines in L3 directory 508 and/or sourcing cache lines of data from cache array 502 by cache-to-cache intervention. L3 cache 232 additionally includes multiple cast-in (CI) machines 513 for servicing cast-in (CI) requests received from the affiliated L2 cache 230 via CI channel 242. As will be appreciated, the servicing of cast-in requests by CI machines 513 may require the replacement of memory blocks in cache array 502. Accordingly, L3 cache 230 also includes castout (CO) machines 510 that manage the removal of memory blocks from cache array 502 and, if necessary, the writeback of those memory blocks to system memory 108. Data removed from L3 cache 232 by CO machines 510 and SN machines 511 is buffered in a CPI (castout push intervention) queue 518 prior to transmission to local interconnect 114.

L3 cache 230 further includes an arbiter 505 that orders the processing of CI requests, RD requests and memory access requests snooped from local interconnect 114. Such memory access requests are forwarded in accordance with the arbitration policy implemented by arbiter 505 to dispatch logic, such as a dispatch pipeline 506, which processes each memory access request with respect to L3 directory 508 and cache array 502 and, if necessary, dispatches the memory access requests to the appropriate state machines 511, 512 or 513 for processing. If necessary, at a predetermined time during processing of the memory access request within dispatch pipeline 506, arbiter 505 transmits the request address to cache array 502 via address and control path 526 to initiate a cache read of the memory block specified by the request address.

Figure 6:
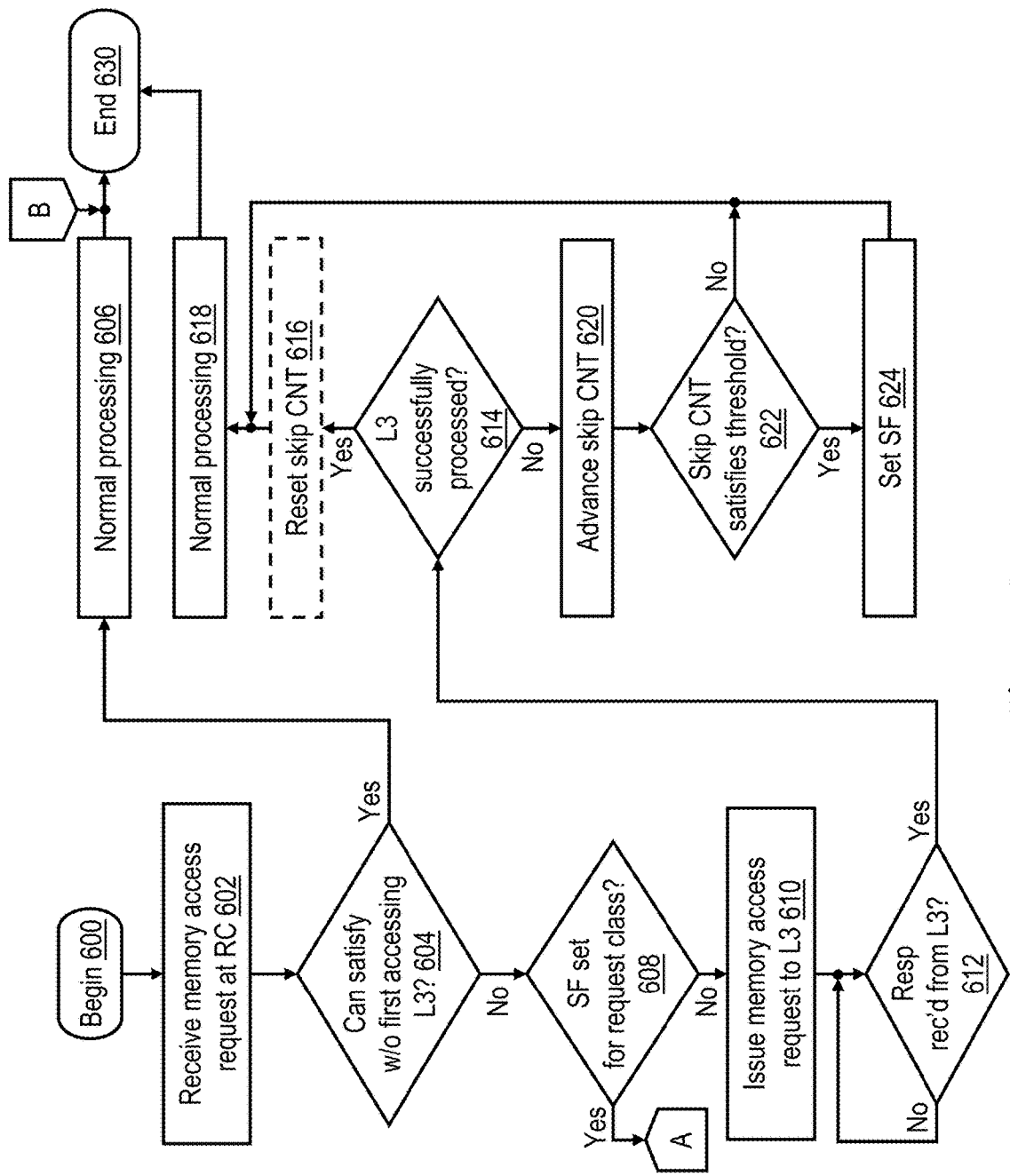
FIG. 6 is a high-level logical flowchart of an exemplary process by which an upper-level cache (e.g., an L2 cache) handles a memory access request.

Referring now to FIG. 6, there is depicted a high-level logical flowchart of an exemplary process by which an upper-level cache (e.g., an L2 cache) handles a memory access request of an associated processor core 200 in accordance with one embodiment. The process of FIG. 6 begins at block 600 and then proceeds to block 602, which illustrates an RC machine 312 of an L2 cache 230 receiving a memory access request of the associated processor core 200, for example, following dispatch of the memory access request from dispatch pipeline 306. As noted above, the memory access request can include a transaction type (ttype), a request address (e.g., a real memory address), and, if a store-type request, store data to be written into the shared distributed memory system. At block 604, the RC machine 312 determines whether or not the memory access request can be satisfied without first accessing the associated L3 cache 232. For example, RC machine 312 can make the determination illustrated at block 604 based at least in part on the class of the memory access request (e.g., load, load-and-reserve, store, store-conditional, etc.) and the coherence state for the request address returned from the lookup performed in L2 directory 308. In response to RC machine 312 determining that the memory access request can be satisfied without first accessing the associated L3 cache 232, RC machine 312 satisfies the memory access request via normal processing (block 606), for example, by accessing the memory block specified by the request address in cache array 302 and either updating the memory block (e.g., if the memory access request is a store-type request) or causing requested data to be returned to the associated processor core 200 (e.g., if the memory access request is a load-type request). For a store-type request, RC machine 312 may additionally initiate one or more interconnect operations on the system interconnect fabric to invalidate other valid cached copies of the requested memory block. Following block 606, the process of FIG. 6 ends at block 630.

Returning to block 604, if RC machine 312 makes a negative determination, RC machine 232 additionally determines at block 608 whether or not the class signal group 412 of the request class of the memory access request indicates that the relevant skip flag (SF) 402 is set. If so, the process continues through page connector A and, in one embodiment or mode, passes to FIG. 7, and in an alternative embodiment or mode, passes to FIG. 8. In some implementations, the selection of which of these modes (i.e., FIG. 7 or FIG. 8) is employed in response to an affirmative determination at block 608 can be made selectable, for example, based on a setting in the memory access request, on a class of the memory access request, and/or a configuration of processing unit 104.

If, on the other hand, RC machine 312 determines at block 608 that the skip flag 402 for the relevant class of memory access requests is not set, RC machine 312 issues the memory access request to the associated L3 cache 232 via read channel 240 (block 610) and awaits a response to the memory access request from L3 cache 232 (block 612). In response to receipt of the memory access request, arbiter 505 of L3 cache 232 issues the request to dispatch pipeline 506, which performs a lookup of the request address in L3 directory 508. If the lookup in L3 directory 508 results in a hit in a coherence state sufficient to service the memory access request and an idle RD machine 512 is available, dispatch pipeline 506 of L3 cache 232 dispatches the memory access request to an idle RD machine 512 for processing. As part of this processing, RD machine 512 provides to L2 cache 230 a response to the memory access request including a copy of the requested memory block sourced from L3 cache array 502 and an indication of a coherence state of the requested memory block. If the lookup in L3 directory 508 results in a miss in L3 directory 508, L3 cache 232 preferably returns to L2 cache 230 a response to the memory access including a failure indication.

In response to receipt of the response of the L3 cache 232, RC machine 312 determines at block 614 whether or not the associated L3 cache 232 successfully processed the memory access request, for example, by determining whether the response to the memory access request includes the requested memory block ad coherence state or a failure indication. In response to RC machine 312 determining at block 614 that the associated L3 cache 232 successfully processed the memory access request, RC machine 312 optionally resets the value of the skip CNT in the skip counter 404 for the relevant class of memory access requests to an initial value (block 616). In some embodiments, the reset of the skip CNT can be performed only after multiple consecutive affirmative determinations at block 614. Following block 614, and possibly optional block 616, RC machine 312 satisfies the memory access request received from its associated processor core 200 via normal processing (block 618), for example, by installing the memory block received from L3 cache 232 in cache array 302 and either updating the memory block (e.g., if the memory access request is a store-type request) or causing requested data to be returned to the associated processor core 200 (e.g., if the memory access request is a load-type request). As noted above, for a store-type request, RC machine 312 may additionally initiate one or more interconnect operations on the system interconnect fabric to invalidate other valid cached copies of the requested memory block. Following block 618, the process of FIG. 6 ends at block 630.

In response to a negative determination at block 614, RC machine 312 advances (e.g., increments in a saturating fashion to avoid overflow) the skip CNT in the skip counter 404 for the relevant class of memory access requests (block 620) and determines if the skip CNT satisfies (e.g., is equal to, or in another embodiment, greater than or equal to) an associated skip CNT threshold applicable to this class of memory access requests (block 622). If RC machine 312 determinates at block 622 that the skip CNT does not satisfy the relevant skip CNT threshold, the process passes directly from block 622 to block 618. If, however, RC machine 312 determines at block 622 that the skip CNT satisfies the skip CNT threshold, RC machine 312 sets the skip flag 402 in the instance of tracking logic 400 associated with the request class of the memory access request (block 624). The process passes from block 624 to block 618.

At block 618, RC machine 312 handles the memory access request via normal processing. As indicated in FIG. 6, in cases in which the process reaches block 618 from either block 622 or block 624, L3 cache 232 was not able to successfully process the memory access request. Accordingly, in such cases at block 618, RC machine 312 initiates on the system interconnect fabric an interconnect operation corresponding to the memory access request. For load-type and store-type memory access requests, the interconnect operation generally requests a copy of the requested memory block in a coherence state sufficient for the requesting L2 cache 230 to successfully complete the memory access request (e.g., by updating the memory block or providing data from the memory block to the associated processor core 200). The interconnect operation on the system interconnect fabric is typically snooped by the other L2 cache(s) 230, all L3 caches 232, and the memory controller 106 in the same processing unit 104 as the initiating L2 cache 230, and depending on the broadcast scope of the interconnect operation, may be snooped by additional caches 230, 232 and memory controllers 106 in the same processing node 102 and/or other processing nodes 102 of data processing system 100. The system memory 108 or cache 230, 232 ultimately serving as the data source for the requested memory block can vary between implementations, depending on the coherence protocol that is implemented. Following block 618, the process of FIG. 6 ends at block 630.

Upon review of the method of FIG. 6 it should be appreciated that different classes of memory access requests can have differing skip CNT thresholds so that, for a certain class or classes of memory access requests, L2 cache 230 can more easily enter an operating mode in which the relevant skip flag 402 is set and, barring assertion of the associated override signal 410, L2 cache 230 issues memory access requests of the class(es) to the system fabric without awaiting results of a directory lookup in the associated L3 cache 232. For example, in at least some embodiments, full cache line store requests that store a full cache line (e.g., 128 B) of data advantageously constitute their own class separate from partial cache line store requests that store less than a full cache line of data. Because full cache line store requests are commonly utilized to initialize un-cached regions of memory and therefore tend to have a higher miss rate in L3 cache 232 than partial cache line store requests, performance of full cache line store requests can be improved by assigning full cache line store requests a lower skip CNT threshold than partial cache line store requests.

Figure 7:
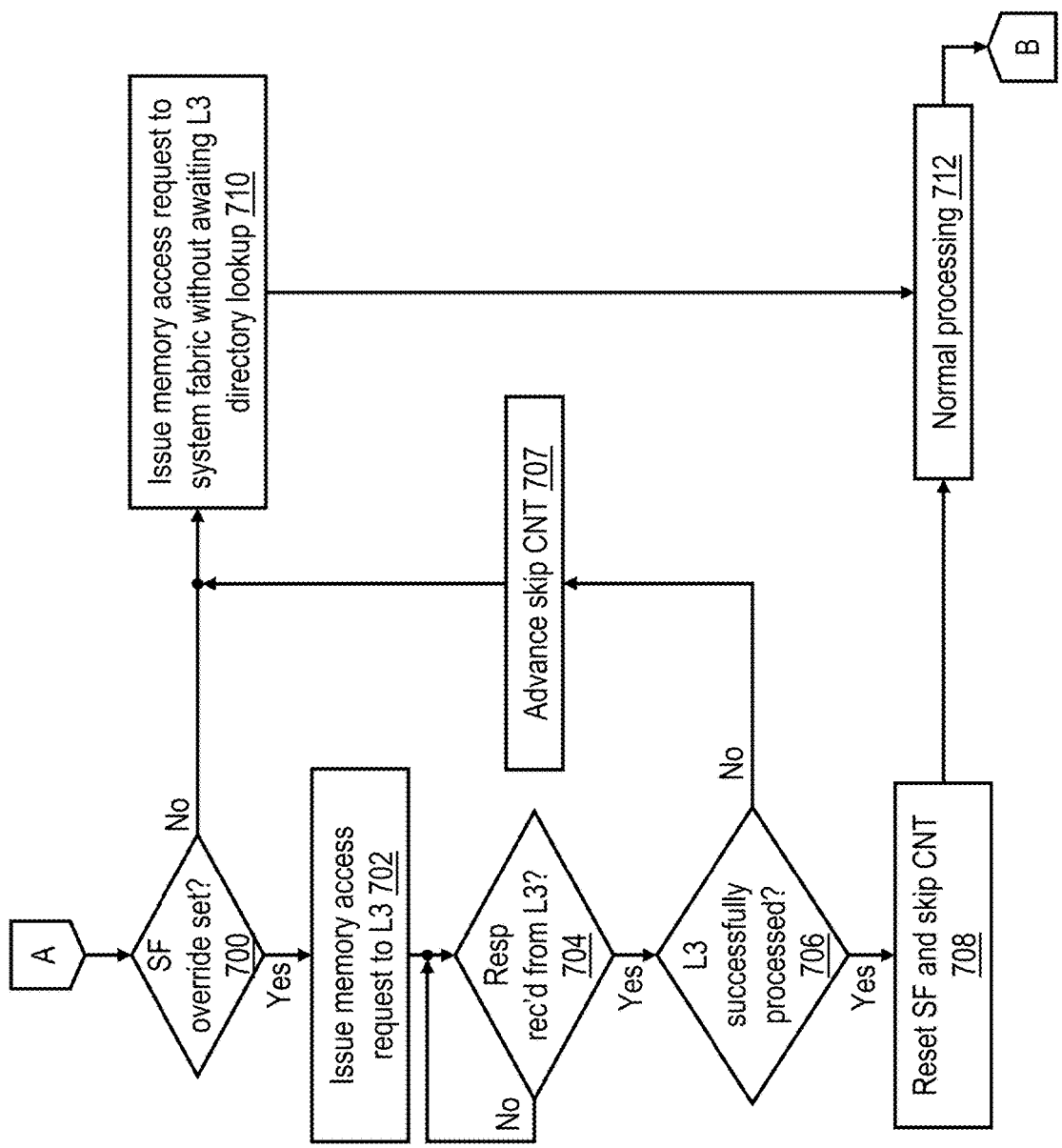
FIG. 7 is a high-level logical flowchart of a process for determining whether to issue a memory access request on a system interconnect fabric without waiting on a result of a directory lookup at a lower-level cache in accordance with a first embodiment.

With reference now to FIG. 7, there is illustrated a high-level logical flowchart of a process for determining whether to issue a memory access request on a system interconnect fabric without waiting on a result of a directory lookup at a lower-level cache in accordance with a first embodiment. The process given in FIG. 7 begins at page connector A and proceeds to block 700, which illustrates the RC machine 312 allocated to handling the memory access request determining whether or not the override signal 410 is asserted in the relevant class signal set 412 for the memory access request it is handling. If not, meaning that the indication provided by the set skip flag 402 is to be observed, the process passes to block 710, which is described below. If, however, RC machine 312 determines at block 700 that override signal 410 is set in the relevant class signal set 412 for the memory access request, L3 cache 232 will be accessed prior to initiating an interconnect operation on the system interconnect fabric despite the relevant skip flag 402 being set, and the process accordingly passes to block 702 and following blocks.

At block 702, RC machine 312 issues the memory access request to the associated L3 cache 232 via read channel 240 (block 702) and awaits a response to the memory access request from L3 cache 232 (block 704). In response to receipt of the memory access request, L3 cache 232 processes the memory access request and provides a response to L2 cache 230, as discussed above. In response to receipt of the response of the L3 cache 232, RC machine 312 determines at block 706 whether or not the L3 cache 232 successfully processed the memory access request, for example, by determining whether the response to the memory access request includes the requested memory block and coherence state or a failure indication.

If RC machine 312 makes a negative determination at block 706 (e.g., the response provided by L3 cache 232 includes a failure indication), RC machine 312 advances (e.g., increments in a saturating fashion) the skip CNT in the relevant skip counter 404 (block 707), and the process passes to block 710, which is described below. If, on the other hand, RC machine 312 determines at block 706 that the associated L3 cache 232 successfully processed the memory access request, RC machine 312 resets skip flag 402 and additionally resets the skip CNT in the skip counter 404 for the relevant class of memory access requests to an initial value (block 708). In some embodiments, the reset of the skip flag 402 and skip CNT can be performed only after multiple consecutive affirmative determinations at block

706. Following block 706, RC machine 312 satisfies the memory access request received from its associated processor core 200 via normal processing (block 712), for example, by installing the memory block received from L3 cache 232 in cache array 302 and either updating the memory block (e.g., if the memory access request is a store-type request) or causing requested data to be returned to the associated processor core 200 (e.g., if the memory access request is a load-type request). As noted above, RC machine 312 may additionally initiate one or more interconnect operations on the system interconnect fabric to invalidate other valid cached copies of the requested memory block. Following block 712, the process of FIG. 7 returns to block 630 of FIG. 6 via page connector B.

Referring now to block 710, if the override signal 410 for the class of requests including the memory access request is not asserted, RC machine 312 initiates an interconnect operation corresponding to the memory access request on the system interconnect fabric without first accessing the associated L3 cache 232, which includes awaiting the results of a lookup in the L3 directory 508 of the associated L3 cache 232. As should be appreciated from the foregoing description provided in connection with block 618, the interconnect operation will be snooped on the system interconnect fabric by the associated L3 cache 232, which may cause the L3 cache 232 to perform a directory lookup of the request address in L3 directory 508. However, it should be appreciated that by initiating the interconnect operation corresponding to the memory access request on the system interconnect fabric without awaiting the results of a lookup in L3 directory 508, RC machine 312 can eliminate the latency in servicing the memory access request that would otherwise be incurred (for example, at blocks 610, 612, and 614 of FIG. 6) in cases in which the associated L3 cache 232 is unable to successfully process the memory access request.

In response to the interconnect operation initiated at block 710, a coherence participant (e.g., a memory controller 106, L2 cache 230, or L3 cache 232) determined by the coherence protocol implemented within data processing system 100 will supply a copy of the requested memory block to the initiating L2 cache 230 in a coherence state that enables the initiating L2 cache 230 to service the memory access request via normal processing, as has been described (block 712). For a store-type request, the RC machine 312 that initiated the interconnect operation may initiate one or more additional interconnect operations on the system interconnect fabric to invalidate other valid cached copies of the requested memory block. Thereafter, the process of FIG. 7 passes through page connector B and returns to block 630 of FIG. 6.

Figure 8:
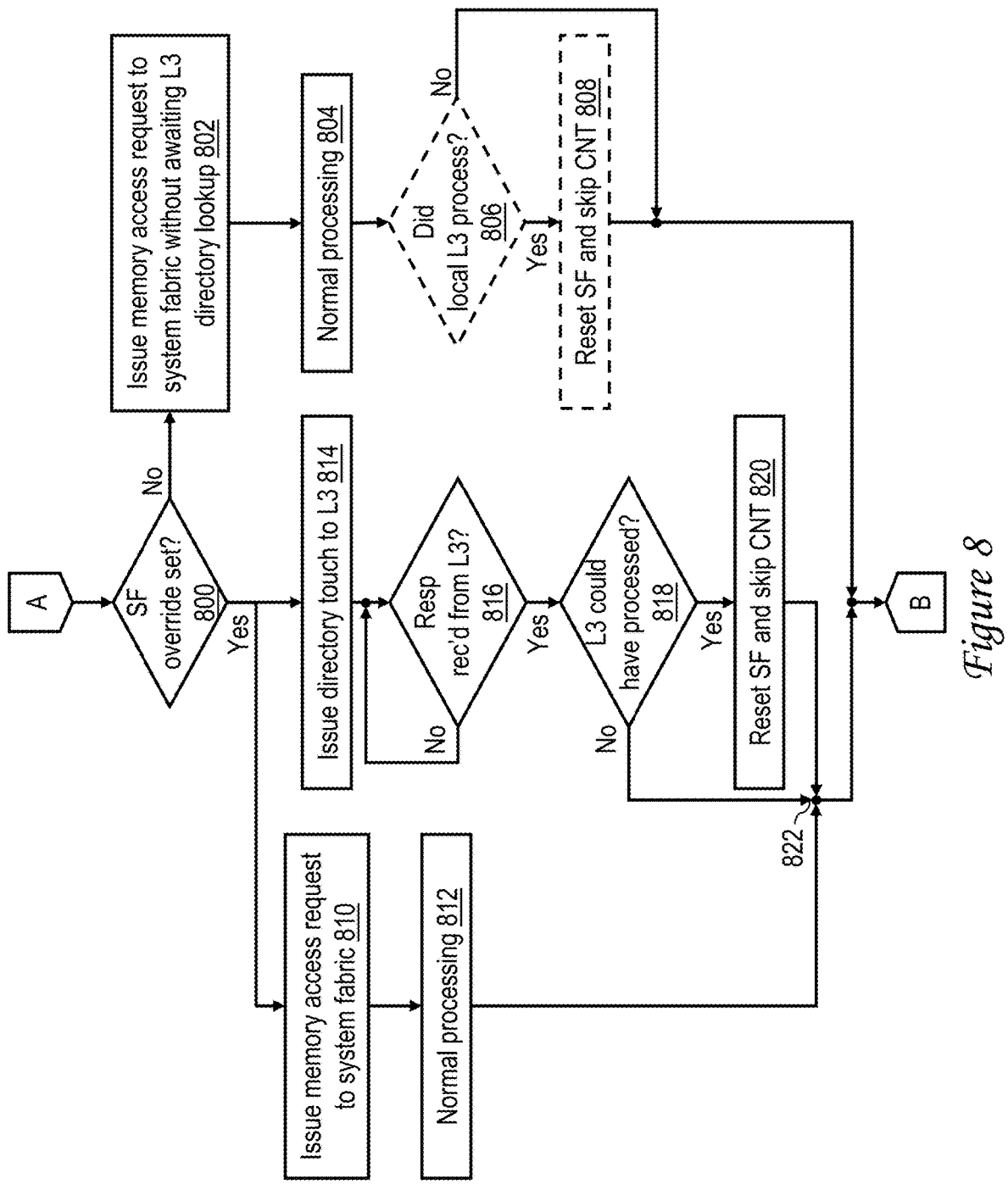
FIG. 8 is a high-level logical flowchart of a process for determining whether to issue a memory access request on a system interconnect fabric without waiting on a result of a directory lookup at a lower-level cache in accordance with a second embodiment.

Referring now to FIG. 8, there is depicted a high-level logical flowchart of a process for determining whether to issue a memory access request on a system interconnect fabric without waiting on a result of a directory lookup at a lower-level cache in accordance with a second embodiment. The process of FIG. 8 begins at page connector A and proceeds to block 800, which illustrates the RC machine 312 allocated to handling the memory access request determining whether or not the override signal 410 is asserted in the relevant class signal set 412 for the memory access request it is handling. If not, meaning that the indication provided by skip flag 402 is to be observed, the process passes to block 802, which illustrates RC machine 312 initiating an interconnect operation corresponding to the memory access request on the system interconnect fabric without first accessing the associated L3 cache 232, which includes awaiting the results of a lookup in the L3 directory 508 of the associated L3 cache 232. As noted above, the interconnect operation will be snooped on the system interconnect fabric by coherence participants within the scope of the interconnect operation, including by the associated L3 cache 232. Again, by initiating the interconnect operation corresponding to the memory access request on the system interconnect fabric without awaiting the results of a lookup in L3 directory 508, RC machine 312 can eliminate the latency in servicing the memory access request that would otherwise be incurred (for example, at blocks 610, 612, and 614 of FIG. 6) in cases in which the associated L3 cache 232 is unable to successfully process the memory access request. In response to the interconnect operation, a coherence participant (e.g., a memory controller 106, L2 cache 230, or L3 cache 232) determined by the coherence protocol implemented within data processing system 100 will supply a copy of the requested memory block to the initiating L2 cache 230 in a coherence state that enables the initiating L2 cache 230 to service the memory access request via normal processing (block 804). As noted above, for a store-type request, this processing may include RC machine 312 initiating one or more interconnect operations on the system interconnect fabric to invalidate other valid cached copies of the requested memory block. In some embodiments, following block 804, the process of FIG. 8 passes directly to page connector B and returns to block 630 of FIG. 6. In other embodiments, RC machine 312 may optionally reset the skip flag 402 and skip counter 404 for the relevant class of memory access request, as shown at block 808, based on a determination at block 806 that the interconnect operation issued at block 802 was serviced by the L3 cache 232 associated with the issuing L2 cache 230. Optionally resetting skip flag 402 and skip counter 404 in this way promotes rapid exit from the operating mode in which interconnect operations are issued for the given request class without awaiting results of a directory lookup in the associated L3 cache 232. Following optional blocks 806-808, the process of FIG. 8 passes through page connector B and returns to block 630 of FIG. 6.

Referring again to block 800, if the RC machine 312 determines that override signal 410 is set in the relevant class signal set 412 for the memory access request, the L3 directory 508 of the associated L3 cache 232 is accessed in parallel with initiating an interconnect operation on the system interconnect fabric, as indicated in FIG. 8 by the bifurcation of the process following an affirmative determination at block 800. In this case, L3 cache 232 initiates an interconnect operation on the system interconnect fabric (block 810), and, in response to receipt of the requested memory block, services the memory access request via normal processing (block 812), as generally discussed above with reference to blocks 802-804. The process then proceeds to join point 822.

In parallel with the operations illustrated at blocks 810-812, L2 cache 230 issues a directory touch request to the associated L3 cache 232 via RD channel 240 to determine if the coherence state associated with the request address in L3 directory 508 indicates that L3 cache 232 could have successfully processed the memory access request (block 814). L3 cache 232 is preferably constructed so that the directory touch request is processed prior to or concurrently with the processing performed at block 812 so that the response to the directory touch request accurately indicates whether L3 cache 232 could have successfully processed the memory access request if it had been issued by L2 cache 230 directly to L3 cache 232. L2 cache 230 then awaits receipt of results of the lookup in L3 directory 508 (block 816) and determines whether the coherence state associated with the request address in L3 directory 508 indicates that L3 cache 232 could have successfully processed the memory access request (block 818). If not, the process proceeds directly from block 818 to join point 822. If, however, the coherence state associated with the request address in L3 directory 508 indicates that L3 cache 232 could have successfully processed the memory access request, RC machine 312 resets skip flag 402 and additionally reset the skip CNT in the skip counter 404 for the relevant class of memory access requests to an initial value (block 820). In some embodiments, the reset of the skip flag 402 and skip CNT can be performed only after multiple consecutive affirmative determinations at block 818. Following block 820, the process passes to join point 822. After the process of FIG. 8 reaches join point 822 from block 812 and one of blocks 818 and 820, the process merges and passes through page connector B to block 630 of FIG. 6.

Figure 9:
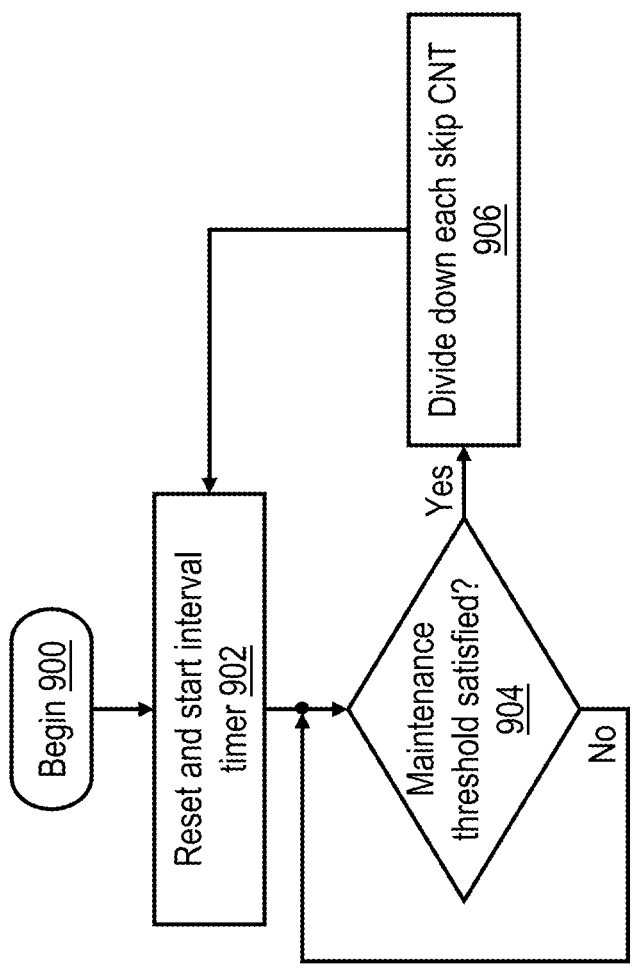
FIG. 9 is a high-level logical flowchart of an exemplary process for reducing a counter value in accordance with one embodiment.

With reference now to FIG. 9, there is illustrated a high-level logical flowchart of an exemplary process for reducing the skip CNTs maintained in skip counters 404 in accordance with one embodiment. The illustrated process can be employed to repetitively adjust the skip CNTs maintained in skip counters 404 so that skip CNTs only reflect instances within a given temporal window where the L3 was unable to process given requests.

The process of FIG. 9 begins at block 900 and then proceeds to block 902, which illustrates directory lookup logic 380 resetting interval timer 420 to an initial value and starting interval timer 420. In various embodiments, directory lookup logic 380 may advance interval timer 420 in response to the number of memory access requests received by L2 cache 230 and/or the elapse of time. At block 904, directory lookup logic 380 determines whether or not the value of interval timer 420 satisfies a maintenance threshold. If not, the process continues to iterate at block 904 until the value of interval timer satisfies the maintenance threshold. In response to directory lookup logic 380 determining at block 904 that the value of interval timer 420 satisfies the maintenance threshold, directory lookup logic 380 divides down each skip CNT, for example, by a predetermined integer power of 2 (e.g., 2, 4, 8, etc.). Thereafter, the process of FIG. 9 returns to block 902.

Figure 10:
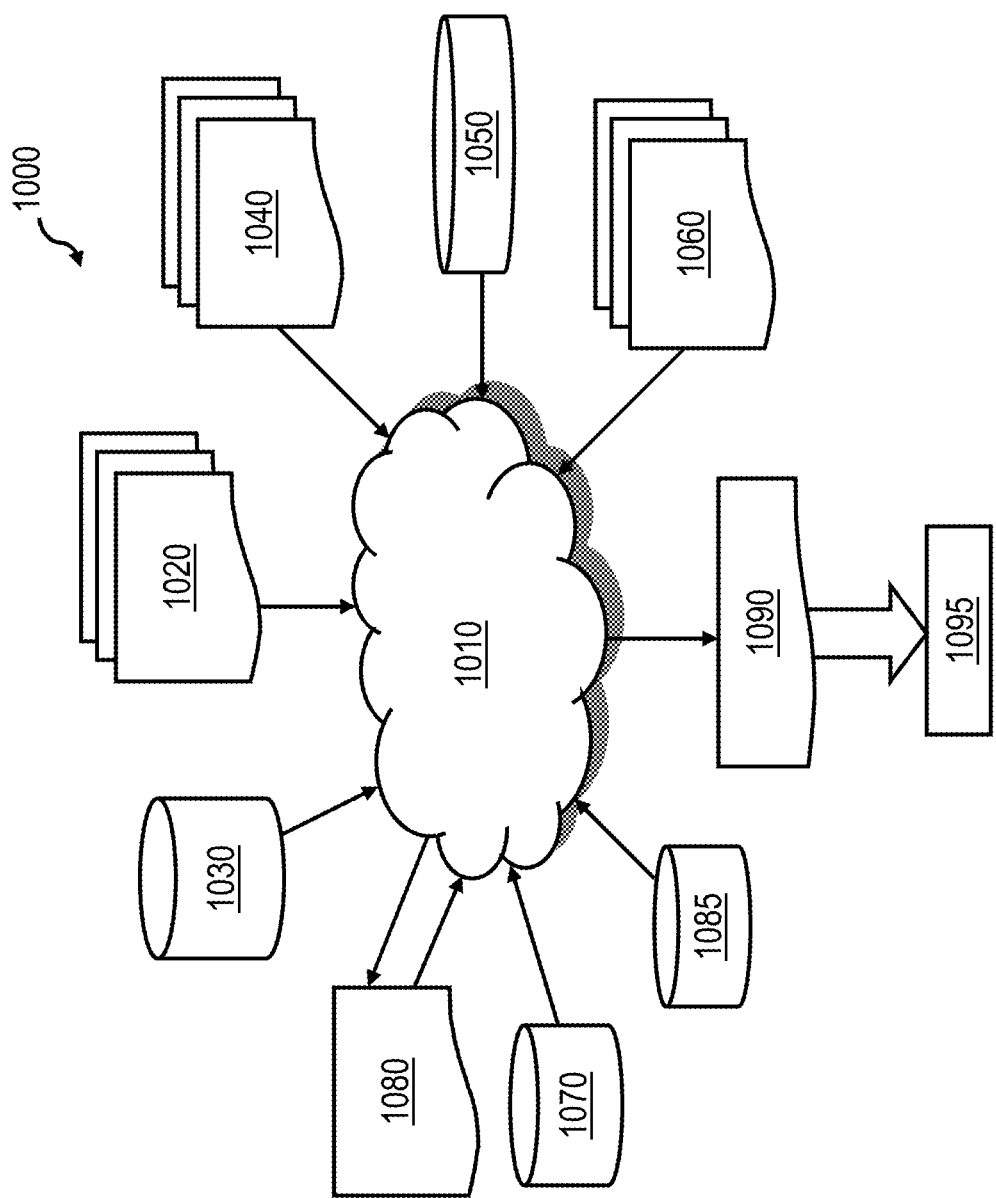
FIG. 10 is a data flow diagram illustrating a design process.

Referring now to FIG. 10, there is depicted a block diagram of an exemplary design flow 1000 used for example, in semiconductor IC logic design, simulation, test, layout, and manufacture. Design flow 1000 includes processes, machines and/or mechanisms for processing design structures or devices to generate logically or otherwise functionally equivalent representations of the design structures and/or devices described above and shown herein. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1010. Design structure 1020 may be a logical simulation design structure generated and processed by design process 1010 to produce a logically equivalent functional representation of a hardware device. Design structure 1020 may also or alternatively comprise data and/or program instructions that when processed by design process 1010, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1010 to simulate or otherwise functionally represent an electronic component, circuit, electronic or logic module, apparatus, device, or system such as those shown herein. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1010 preferably employs and incorporates hardware and/or software modules for synthesizing, translating, or otherwise processing a design/simulation functional equivalent of the components, circuits, devices, or logic structures shown herein to generate a netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1010 may include hardware and software modules for processing a variety of input data structure types including netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1040, characterization data 1050, verification data 1060, design rules 1070, and test data files 1085 which may include input test patterns, output test results, and other testing information. Design process 1010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1010 without deviating from the scope and spirit of the invention. Design process 1010 may also include modules for performing standard circuit design processes such as timing analysis, verification, design rule checking, place and route operations, etc.

Design process 1010 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1090 may comprise a compiled, executable HDL simulation model that functionally simulates the devices shown herein.

Design structure 1090 may also employ a data format used for the exchange of layout data of integrated circuits and/or symbolic data format (e.g., information stored in a GDSII (GDS2), GL1, OASIS, map files, or any other suitable format for storing such design data structures). Design structure 1090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1090 may then proceed to a stage 1095 where, for example, design structure 1090: proceeds to tape-out, is released to manufacturing, is released to a mask house, is sent to another design house, is sent back to the customer, etc.

As has been described, in at least one embodiment, an upper level cache receives from an associated processor core a plurality of memory access requests including at least first and second memory access requests of differing first and second classes. Based on class histories associated with the first and second classes of memory access requests, the upper level cache initiates, on the system interconnect fabric, a first interconnect transaction corresponding to the first memory access request without first issuing the first memory access request to the lower level cache via a private communication channel between the upper level cache and the lower level cache. The upper level cache initiates, on the system interconnect fabric, a second interconnect transaction corresponding to the second memory access request only after first issuing the second memory access request to the lower level cache via the private communication channel between the upper level cache and the lower level cache and receiving a response to the second memory access request from the lower level cache.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes signal media.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including an interconnect fabric coupled to a plurality of processor cores each supported by an upper level cache and a lower level cache, the method comprising:

an upper level cache receiving from an associated processor core a plurality of memory access requests including at least first and second memory access requests, wherein the first memory access request is of a first class of memory access requests and the second memory access request is of a different second class of memory access requests; and based on class histories associated with the first and second classes of memory access requests:
the upper level cache initiating, on the system interconnect fabric, a first interconnect transaction corresponding to the first memory access request without first issuing the first memory access request to the lower level cache via a private communication channel between the upper level cache and the lower level cache; and
the upper level cache initiating, on the system interconnect fabric, a second interconnect transaction corresponding to the second memory access request only after first issuing the second memory access request to the lower level cache via the private communication channel between the upper level cache and the lower level cache and receiving a response to the second memory access request from the lower level cache.

2. The method of claim 1, and further comprising:
the upper level cache maintaining a respective class history for each of a plurality of classes of memory access requests.

3. The method of claim 2, wherein maintaining a respective class history for each of the plurality of classes of memory access requests includes:
the upper level cache maintaining a counter for each of the plurality of classes of memory access requests; and
the upper level cache advancing the counter for the second class of memory access requests based on the response to the second memory access request received from the lower level cache indicating failure of the lower level cache to successfully service the second memory access request.

4. The method of claim 3, further comprising:
the upper level cache resetting the counter for the second class of memory access requests based on the lower level cache successfully processing a third memory access request of the second class.

5. The method of claim 3, further comprising:
the upper level cache issuing a directory touch request to the lower level cache; and
the upper level cache resetting the counter for the second class of memory access requests based on a response to the directory touch request indicating the lower level cache could have successful processed a third memory access request of the second class.

6. The method of claim 1, further comprising:
the upper level cache issuing a third memory access request of the first class to the lower level cache via the private communication channel regardless of a class history of the first class indicating not to issue the third memory access request based on a pseudo-random signal.

7. The method of claim 1, wherein:
the lower level cache is a victim cache; and
the method further comprises populating the lower level cache with data cast out from the upper level cache.

8. A processing unit for a multiprocessor data processing system, comprising:
a processor core;
an upper level cache coupled to the processor core and configured to be coupled to a system interconnect fabric of the multiprocessor data processing system; and
a lower level cache coupled to the upper level cache via a private communication channel, wherein the upper level cache is configured to perform:
receiving from the processor core a plurality of memory access requests including at least first and second memory access requests, wherein the first memory access request is of a first class of memory access requests and the second memory access request is of a different second class of memory access requests; and
based on class histories associated with the first and second classes of memory access requests:
initiating, on the system interconnect fabric, a first interconnect transaction corresponding to the first memory access request without first issuing the first memory access request to the lower level cache via the private communication channel between the upper level cache and the lower level cache; and
initiating, on the system interconnect fabric, a second interconnect transaction corresponding to the second memory access request only after first issuing the second memory access request to the lower level cache via the private communication channel between the upper level cache and the lower level cache and receiving a response to the second memory access request from the lower level cache.

9. The processing unit of claim 8, and further comprising:
a plurality of instances of tracking logic each maintaining a respective class history for a respective one of the plurality of classes of memory access requests.

10. The processing unit of claim 9, wherein:
each of plurality of instances of tracking logic includes a counter for one of the plurality of classes of memory access requests; and
the upper level cache is configured to advance the counter for the second class of memory access requests based on the response to the second memory access request received from the lower level cache indicating failure of the lower level cache to successfully service the second memory access request.

11. The processing unit of claim 10, wherein the upper level cache is configured to reset the counter for the second class of memory access requests based on the lower level cache successfully processing a third memory access request of the second class.

12. The processing unit of claim 10, wherein the upper level cache is configured to reset the counter for the second class of memory access requests based on a response by the lower level cache to a directory touch request of the upper level cache indicating the lower level cache could have successful processed a third memory access request of the second class.

13. The processing unit of claim 8, wherein the upper level cache is configured to issue a third memory access request of the first class to the lower level cache via the private communication channel regardless of a class history of the first class indicating not to issue the third memory access request based on a pseudo-random signal.

14. The processing unit of claim 8, wherein the lower level cache is a victim cache populated with data cast out from the upper level cache.

15. A data processing system, comprising:
a plurality of processing units in accordance with claim 8; and
the system interconnect fabric coupling the plurality of processing units.

16. A design structure tangibly embodied in a machine-readable storage medium for designing, manufacturing, or testing an integrated circuit, the design structure comprising:
a processing unit for a multiprocessor data processing system, comprising:
a processor core;
an upper level cache coupled to the processor core and configured to be coupled to a system interconnect fabric of the multiprocessor data processing system; and
a lower level cache coupled to the upper level cache via a private communication channel, wherein the upper level cache is configured to perform:

receiving from the processor core a plurality of memory access requests including at least first and second memory access requests, wherein the first memory access request is of a first class of memory access requests and the second memory access request is of a different second class of memory access requests; and based on class histories associated with the first and second classes of memory access requests:

initiating, on the system interconnect fabric, a first interconnect transaction corresponding to the first memory access request without first issuing the first memory access request to the lower level cache via the private communication channel between the upper level cache and the lower level cache; and initiating, on the system interconnect fabric, a second interconnect transaction corresponding to the second memory access request only after first issuing the second memory access request to the lower level cache via the private communication channel between the upper level cache and the lower level cache and receiving a response to the second memory access request from the lower level cache.

17. The design structure of claim 16, and further comprising:
  a plurality of instances of tracking logic each maintaining a respective class history for a respective one of the plurality of classes of memory access requests.

18. The design structure of claim 17, wherein:
  each of plurality of instances of tracking logic includes a counter for one of the plurality of classes of memory access requests; and
  the upper level cache is configured to advance the counter for the second class of memory access requests based on the response to the second memory access request received from the lower level cache indicating failure of the lower level cache to successfully service the second memory access request.

19. The design structure of claim 18, wherein the upper level cache is configured to reset the counter for the second class of memory access requests based on the lower level cache successfully processing a third memory access request of the second class.

20. The design structure of claim 18, wherein the upper level cache is configured to reset the counter for the second class of memory access requests based on a response by the lower level cache to a directory touch request of the upper level cache indicating the lower level cache could have successful processed a third memory access request of the second class.

* * * * *